Patented Dec. 18, 1951

2,578,910

UNITED STATES PATENT OFFICE 2,578,910

POLYMERIZATION OF VINYL COMPOUNDS IN THE PRESENCE OF HETEROCYCLIC NITROGEN COMPOUNDS AS ACTIVATORS

Carl A. Uraneck, Borger, Tex., assignor to Phillips Petroleum Company, a corporation of Delaware No Drawing. Application June 1, 1948, Serial No. 30,517

14 Claims. (Cl. 260—84.1)

This invention relates to the polymerization of vinyl compounds to produce polymers of high molecular weight. In a preferred embodiment, it relates to the production of normally solid polymeric materials of the nature of synthetic rubber by polymerization of monomeric materials comprising a conjugated diolefin while dispersed in aqueous emulsion.

Emulsion polymerization recipes of various types, which are applicable over a wide range of conditions, have been developed for the purpose of producing synthetic elastomers. Numerous variations have been introduced in the interest of obtaining materials possessing a wide variety of properties. Among other ingredients employed in polymerization recipes, materials known as activators are essential in order that the reaction will proceed at a practicable rate until the desired conversion has been reached.

I have now discovered a new type of activator which may be employed in a variety of emulsion polymerization recipes and over a broad temperature range. These activators, or activator compositions, comprise complex compounds containing heavy metals in combination with a heterocyclic nitrogen compound. While numerous nitrogen-containing heterocyclic compounds may be employed in the preparation of the activators as described herein, the one essential grouping in the structure thereof is the

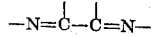

linkage.

One object of this invention is to polymerize unsaturated organic compounds.

Another object of this invention is to produce an improved synthetic rubber.

A further object of this invention is to produce a synthetic rubber by polymerization of monomeric material in aqueous emulsion at temperatures lower than ordinarily used.

Still another object of this invention is to obtain a high reaction rate in polymerizing unsaturated organic compounds in aqueous emulsion.

Other objects and advantages of this invention will become apparent, to one skilled in the art, from the accompanying disclosure and discussion.

The nitrogen-containing component of the activator compositions used in this invention contains the aforementioned linkage as a constituent of separate or combined ring structures. Specific examples of such nitrogen compounds are illustrated by the following conventional structural formulae of polyheterocyclic organic nitrogen compounds, wherein carbon and hydrogen atoms are only diagrammatically represented.

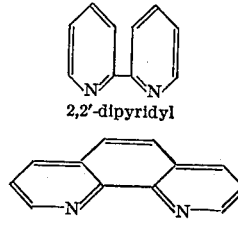

2,2'-dipyridyl    2-(2'-pyridyl)quinoline

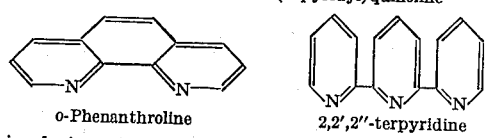

o-Phenanthroline    2,2',2''-terpyridine

It is obvious that these particular compounds are all members of a family of compounds which contain the basic structure of 2,2'-dipyridyl.

Alkyl, alkoxy, and halogen derivatives of these compounds are also applicable. In general, such alkyl and alkoxy groups should not exceed four carbon atoms, and more frequently they should contain only one or two carbon atoms. Since it is well known that ring structures of the type described possess a resonating system of double bonds, it is obvious that the characteristic linkage

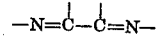

may also be represented by

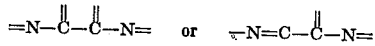

In addition to the nitrogen-containing component, the activator compositions herein described contain heavy metals which are capable of existing in at least two different valence states, such as iron, cobalt, nickel, manganese, and chromium. Water-soluble salts of these metals are employed in the preparation of the activators, and particularly iron salts in which the iron is present either in the ferrous or ferric state. In the interest of availability and convenience, the sulfate is most frequently employed. In some instances a ferrous salt is preferred, while in other cases either a ferrous or ferric salt may be employed. The choice of the iron, or other metal, compound is determined largely by the polymerization recipe in which the activator is to be used. The actual activator, or activator composition, is apparently a water-soluble complex salt of the heavy metal and the polyheterocyclic organic nitrogen compound.

The activator composition may be prepared by charging predetermined quantities of the reactants to a calibrated vessel into which water is introduced until the desired volume is reached.

The mixture is stirred or otherwise agitated until the material becomes homogeneous.

The mol ratio of heavy metal compound to the nitrogen-containing component may be varied from 1:1 to 1:6, with a ratio not to exceed 1:4 being most generally preferred. The amount of activator composition employed is dependent upon the polymerization recipe in which it is used as well as upon the temperature of operation. In general the quantity added is such that the amount of activator complex is 0.5 to 3 parts, and the total amount of aqueous activator solution charged, per polymerization run, ranges from 5 to 20 parts per 100 parts of monomer material. This amount of activator generally contains from about 0.01 to 0.2 part heavy metal, or in cases where ferrous sulfate is used, from 0.05 to 1.0 part. These parts are all parts by weight per 100 parts of monomeric substance.

When operating with the activators of this invention conventional polymerization techniques are employed. The various ingredients are charged to the reactor and the temperature adjusted to the desired level, after which the activator is introduced, all at once or, if preferred, either at intervals or continuously throughout the polymerization period. At the conclusion of the reaction, or when a desired conversion has been reached, the reaction is shortstopped, and the reaction products are treated with an antioxidant, coagulated, and dried.

The monomeric material polymerized to produce polymers by the process of this invention comprises unsaturated organic compounds which generally contain the characteristic structure $CH_2=C<$ and, in most cases, have at least one of the disconnected valencies attached to an electronegative group, that is, a group which increases the polar character of the molecule, such as a chlorine group or an organic group containing a double or triple bond such as vinyl, phenyl, cyano, carboxy or the like. Included in this class of monomers are the conjugated butadienes, or 1,3-butadiene such as butadiene (1,3-butadiene), 2,3-dimethyl-1,3-butadiene, isoprene, piperylene, 3-furyl-1,3-butadiene, 3-methoxy-1,3-butadiene and the like; haloprenes, such as chloroprene, (2-chloro-1,3-butadiene) bromoprene, methylchloroprene (2-chloro-3-methyl-1,3-butadiene), and the like; aryl olefins such as styrene, various alkyl styrenes, p-chloro-styrene, p-methoxystyrene, alpha-methylstyrene, vinylnaphthalene and similar derivatives thereof, and the like; acrylic and substituted acrylic acids and their esters, nitriles and amides such as acrylic acid, methacrylic acid, methyl acrylate, ethyl acrylate, methyl alpha-chloro-acrylate, methyl methacrylate, ethyl methacrylate, butyl methacrylate, methyl ethacrylate, acrylonitrile, methacrylonitrile, methacrylamide and the like, methyl isopropenyl ketone, methyl vinyl ketone, methyl vinyl ether, vinylethinyl alkyl carbinols, vinyl acetate, vinyl chloride, vinylidene chloride, vinylfurane, vinylcarbazole, vinylacetylene, and other unsaturated hydrocarbons, esters, alcohols, acids, ethers, etc., of the types described. Such unsaturated compounds may be polymerized alone, in which case simple linear polymers are formed, or mixtures of two or more of such compounds which are copolymerizable with each other in aqueous emulsion may be polymerized to form linear copolymers.

The process of this invention is particularly effective when the monomeric material polymerized is a polymerizable aliphatic conjugated diolefin or a mixture of such a conjugated diolefin with lesser amounts of one or more other compounds containing an active $CH_2=C<$ group which are copolymerizable therewith such as aryl olefins, acrylic and substituted acrylic acids, esters, nitriles and amides, methyl isopropenyl ketone, vinyl chloride and similar compounds mentioned hereinabove. In this case the products of the polymerization are high molecular weight linear polymers and copolymers which are rubbery in character and come within the term synthetic rubber. Although, as can be readily deduced from the foregoing, there is a host of possible reactants, the most readily and commecially available monomers at present are butadiene itself (1,3-butadiene) and styrene. The invention will, therefore, be more particularly discussed and exemplified with reference to these typical reactants.

When operating according to the method of this invention temperatures may range from about $-30$ to about 70° C., with temperatures from about $-15$ to about 20° C. usually preferred. Obviously, when polymerizations are carried out in aqueous emulsion in the absence of freezing point depressants, temperatures much below the freezing point of water cannot be employed. The use of various additive agents, however, makes a process of the type disclosed herein applicable at lower temperatures, and, in fact, this is one of the distinct advantages of the present invention. An example of such a low temperature system is a glycerin-water solution, and the term "aqueous emulsion" should be construed to include the use of an aqueous medium comprising water and a sufficient amount of a water-soluble component, preferably organic, to lower the freezing point below the desired polymerization temperature, i. e., an "antifreeze system," whether or not the actual polymerization temperature is above or below 0° C. It is generally preferred that the emulsion be of an "oil in water" type, with the ratio of aqueous medium to monomeric material between about 1.5:1 and about 2.75:1, in parts by weight. At low ratios the emulsions tend to have high viscosities and at high ratios the yield per unit volume of reactor per unit of time is low. In the practice of the invention suitable means will be necessary to establish and maintain an emulsion and to remove reaction heat to maintain a desired reaction temperature. The polymerization may be conducted in batches, semicontinuously, or continuously. The total pressure on the reactants is preferably at least as great as the total vapor pressure of the mixture, so that the initial reactants will be present in liquid phase.

The activators used in the process of this invention can be used in any emulsion copolymerization process in which a polymerization initiator is used. It has now been well established, by numerous workers, that emulsion polymerizations proceed by a free radical mechanism. The initiator, or initiator composition or system, is a material or composition which generates free radicals at a definite and controlled, or controllable, rate under the polymerization conditions and throughout the course of the polymerization reaction. The radicals thus generated initiate polymer chains, primarily through addition to a monomer molecule $(R \cdot + M \rightarrow RM \cdot)$. However, a secondary method of initiation is believed to involve dehydrogenation of a monomer molecule by a radical $(R \cdot + M \rightarrow RH + M' \cdot)$. Free radicals can be generated, under emulsion polymerization conditions, by thermal decomposition of peroxides, hydroperoxides, diazoamino compounds, diazo thioethers, and the like, by catalyzed decompositions of such materials, and by oxidation-reduction reactions involving electron shifts, as in the so-called redox systems. Any such compound, composition, or system which generates free radicals under emulsion polymerization conditions during a polymerization period is known as an initiator. It is believed clear from the foregoing that such an initiator not only initiates a polymerization reaction at the start of the polymerization period but also, and more importantly, continuously initiates formation of polymer chains throughout the polymerization period. The complex water-soluble salts used in the process of this invention "activate" such initiators, and it is for this reason that they are termed activators.

Examples of recipes in which these activators are particularly applicable are diazo thioether recipes, which may be activated by iron compounds, and those in which peroxidic oxidizing agents are present, such as hydrogen peroxide, organic peroxides and hydroperoxides. In such recipes, when a diazo thioether is employed it is generally used in an amount between 0.5 and 5 parts by weight, and when a hydroperoxide, peroxide, or the like, is employed it is generally used in an amount between 0.02 and 2 parts by weight, all per 100 parts of monomers. The activators are equally applicable in redox recipes wherein an organic reducing agent is present, such as sugar, or in sugar-free recipes. As previously discussed herein, they may be employed when operating either in antifreeze systems, or in water emulsions alone, at temperatures ranging from about −30 to about 70° C. They may also be employed when operating over a broad pH range, generally from about 8 to about 12.

Advantages of this invention are illustrated by the following examples. The reactants, and their proportions, and the other specific ingredients of the recipes, are presented as being typical and should not be construed to limit the invention unduly.

*Example I*

Ferrous-2,2'-dipyridyl sulfate was employed as an activator in the following cumene hydroperoxide recipe:

| | |
|---|---|
| Butadiene  parts by weight | 70 |
| Styrene  do | 30 |
| Water  do | 125 |
| Methanol  do | 36 |
| Potassium laurate (pH 9.5)  do | 5 |
| Cumene hydroperoxide  do | 0.72 |
| Mercaptan blend [1]  do | 0.25 |
| Potassium chloride  do | 0.3 |
| Ferrous-2,2'-dipyridyl sulfate solution [2]  ml | 10 |

[1] A blend of tertiary $C_{12}$, $C_{14}$, and $C_{16}$ mercaptans in a ratio of 3:1:1 parts by weight.
[2] The 10 ml. of activator solution contained 0.8 part $FeSO_4 \cdot 7H_2O$ and the mol ratio of $FeSO_4 \cdot 7H_2O$:2,2'-dipyridyl was 1:3.

The potassium chloride was added to the water-methanol solution of the emulsifying agent, and this mixture was charged to the reactor after which the mercaptan in admixture with the styrene was introduced. The cumene hydroperoxide (also known as alpha,alpha-dimethylbenzyl hydroperoxide, see Vandenberg et al., Ind. Eng. Chem., vol. 40, 932 (May 1948) or, more formally, as phenyl(dimethyl)hydroperoxymethane) was then added, followed by the butadiene, and the reactor contents adjusted to a temperature of −10° C. The activator solution was then injected and the reactants agitated throughout the polymerization period. A conversion of 50.8 per cent was attained in 15 hours.

A run similar to that described above was made except that the activator employed contained 0.4 part ferrous sulfate. The ratio of ferrous sulfate to 2,2'-dipyridyl was 1:3 as in the first case. A conversion of 30.1 per cent was reached at the end of a 15-hour reaction period.

A third run in which the activator contained 0.8 part ferrous sulfate and the ratio of ferrous sulfate to 2,2'-dipyridyl was 1:2 was made using the same recipe and procedure. The conversion after 15 hours was 32.9 per cent.

When polymerizations are carried out using isoprene in place of butadiene, similar results are obtained except that the reactions proceed at a somewhat slower rate.

*Example II*

The recipe of Example I was followed except that the activator contained 0.195 part ferrous sulfate. The ratio of ferrous sulfate to 2,2'-dipyridyl was 1:3. A 24.8 per cent conversion was reached in 19.5 hours and after 43.5 hours a 62.7 per cent conversion was obtained.

*Example III*

The following polymerization recipe was employed using ferrous-2,2'-dipyridyl sulfate as the activator:

| | |
|---|---|
| Butadiene  parts by weight | 70 |
| Styrene  do | 30 |
| Water  do | 180 |
| Methanol  do | 54 |
| Potassium oleate (pH 9.6)  do | 5 |
| Cumene hydroperoxide  do | 0.96 |
| Mercaptan blend [1]  do | 0.26 |
| Activator [2]  ml | 12 |
| $FeSO_4 \cdot 7H_2O$  parts by weight | 0.558 |
| 2,2'-dipyridyl  do | 0.94 |

[1] A blend of tertiary $C_{12}$, $C_{14}$, and $C_{16}$ mercaptans in a ratio of 3:1:1 parts by weight.
[2] 2.32 g. $FeSO_4 \cdot 7H_2O$ and 3.91 g. 2,2'-dipyridyl were dissolved in sufficient water to make a volume of 50 ml.

Polymerization was effected at −10° C. according to the procedure of Example I. A 51.4 per cent conversion was obtained in a 19-hour reaction period. The reaction was allowed to continue for a total time of 43.6 hours at the end of which time the conversion was 84.1 per cent.

*Example IV*

A complex formed by the interaction of ferrous sulfate with o-phenanthroline was employed as an activator using the recipe of Example I. The amount of ferrous sulfate used in each of two runs was 0.4 and 0.8 part, respectively, and the mol ratio of ferrous sulfate to o-phenanthroline was 1:2. Polymerization was effected at −10° C. according to the procedure of Example I. The following results were obtained:

| $FeSO_4 \cdot 7H_2O$, Parts | Per Cent Conversion, 17 Hours |
|---|---|
| 0.4 | 57.0 |
| 0.8 | 46.9 |

Example V

Polymerization is effected according to the following recipe:

| | |
|---|---|
| Butadiene ____parts by weight__ | 72 |
| Styrene ____do____ | 28 |
| Water ____do____ | 180 |
| Rosin soap, pH 10.0 ____do____ | 5 |
| Mercaptan blend [1] ____do____ | 0.4 |
| Cumene hydroperoxide ____do____ | 0.2 |
| Glucose ____do____ | 3 |
| Activator [2] ____ml__ | 12 |

[1] A blend of tertiary $C_{12}$, $C_{14}$, and $C_{16}$ mercaptans in a ratio of 3:1:1 parts by weight.
[2] 2.32 g. $FeSO_4 \cdot 7H_2O$ and 3.91 g. 2,2'-dipyridyl were dissolved in sufficient water to make a volume of 50 ml.

Polymerization of the reactants at 15° C. proceeds rapidly, a conversion of 60 per cent being obtained in 6 hours.

Example VI

Butadiene and styrene were copolymerized at 5° C., using the following recipe:

| | |
|---|---|
| Butadiene/styrene ____parts by weight__ | 70/30 |
| Water ____do____ | 180 |
| Mercaptan blend [1] ____do____ | 0.25 |
| Rosin soap (pH 10.0) ____do____ | 5.0 |
| Cumene hydroperoxide ____do____ | 0.36 |
| Activator ____ml__ | 12 |
| $CoCl_2 \cdot 6H_2O$ ____parts by weight__ | 0.476 |
| 2,2'-dipyridyl ____do____ | 0.94 |

[1] A blend of tertiary $C_{12}$, $C_{14}$, and $C_{16}$ mercaptans in a ratio of 3:1:1 parts by weight.

Twelve per cent conversion of the monomers was obtained in 10 hours.

Example VII

The recipe of Example I was employed except that the activator used was ferrous-2,2'-dipyridyl perchlorate. The activator was charged as a solid to the soap solution prior to the addition of the remaining ingredients. Polymerization was carried out at −10° C. In two parallel runs using different amounts of activator, the following results were obtained:

| Run No. | Solid Activator, Parts/100 Parts Monomers | Conversion, Per Cent, 18 hours |
|---|---|---|
| I | 0.7 | 47.6 |
| II | 1.0 | 60.0 |

When run I was repeated and the polymerization allowed to continue for 39.5 hours an 82 per cent conversion was reached.

As will be evident to those skilled in the art, various modifications of this invention can be made, or followed, in the light of the foregoing disclosure and discussion, without departing from the spirit or scope of the disclosure or from the scope of the claims.

I claim:

1. In a process for the production of a polymeric synthetic rubber by copolymerization in aqueous emulsion of a monomeric material comprising a major amount of 1,3-butadiene and a minor amount of styrene, the improvement which comprises effecting said polymerization at a temperature between −30 and 20° C. in the presence of 0.02 to 2 parts of phenyl(dimethyl)-hydroperoxymethane and of 0.5 to 3 parts of ferrous-2,2'-dipyridyl sulfate, all being parts by weight per 100 parts of said monomeric material.

2. In a process for the production of a polymeric synthetic rubber by copolymerization in aqueous emulsion of a monomeric material comprising a major amount of 1,3-butadiene and a minor amount of styrene in the presence of a polymerization initiator, the improvement which comprises effecting said polymerization in the presence of a water-soluble ferrous-2,2'-dipyridyl salt in an amount between 0.5 and 3 parts by weight per 100 parts of said monomeric material.

3. In a process for the production of polymeric synthetic rubber by copolymerization in aqueous emulsion of a monomeric material comprising a major amount of styrene, the improvement which comprises effecting said polymerization at a temperature between −30 and 20° C. in the presence of 0.02 to 2 parts of phenyl(dimethyl)-hydroperoxymethane and of 0.5 to 3 parts of ferrous o-phenanthroline sulfate, all being parts by weight per 100 parts of said monomeric material.

4. In a process for the production of a polymeric synthetic rubber by copolymerization in aqueous emulsion of a monomeric material comprising a major amount of 1,3-butadiene and a minor amount of styrene in the presence of a polymerization initiator, the improvement which comprises effecting said polymerization in the presence of a water-soluble ferrous o-phenanthroline salt in an amount between 0.5 and 3 parts by weight per 100 parts of said monomeric material.

5. In a process for the production of a polymeric synthetic rubber by copolymerization in aqueous emulsion of a monomeric material comprising a major amount of 1,3-butadiene and a minor amount of styrene, the improvement which comprises effecting said polymerization at a temperature between −30 and 20° C. in the presence of 0.02 to 2 parts of phenyl(dimethyl)hydroperoxymethane and of 0.5 to 3 parts of cobaltous-2,2'-dipyridyl chloride, all being parts by weight per 100 parts of said monomeric material.

6. In a process for the production of a polymeric synthetic rubber by copolymerization in aqueous emulsion of a monomeric material comprising a major amount of 1,3-butadiene and a minor amount of styrene in the presence of a polymerization initiator, the improvement which comprises effecting said polymerization in the presence of a water-soluble cobaltous-2,2'-dipyridyl salt in an amount between 0.5 and 3 parts by weight per 100 parts of said monomeric material.

7. In the production of a polymeric synthetic rubber by polymerization in aqueous emulsion of a monomeric material comprising a major amount of 1,3-butadiene in the presence of a polymerization initiator, the improvement which comprises effecting said polymerization in the presence of a water-soluble complex of a water-soluble iron salt and a polyheterocyclic organic compound selected from the group consisting of 2,2'-dipyridyl, 2-(2'-pyridyl)quinoline, o-phenanthroline, and 2,2',2''-terpyridine in an amount between 0.5 and 3 parts by weight per 100 parts of said monomeric material.

8. In a process for the polymerization in aqueous emulsion of a monomeric material comprising an unsaturated organic compound containing an active $CH_2=C<$ group and which is polymerizable when dispersed in an aqueous emulsion in the presence of a polymerization initiator, the improvement which comprises polymerizing such a material in such an emulsion in the presence of 0.5 to 3 parts by weight per 100 parts of said monomeric material of a water-soluble complex of a water-soluble salt of a heavy metal which is capable of existing in each of two valance states and a polyheterocyclic organic compound selected from the group consisting of 2,2'-dipyridyl, 2-(2'-pyridyl)quinoline, o-phenanthroline, and 2,2',2''-terpyridine.

9. The process of claim 8 in which said heavy metal is cobalt.

10. The process of claim 8 in which said heavy metal is iron.

11. A process for the polymerization of an unsaturated organic compound containing an active $CH_2=C<$ group and polymerizable when dispersed in an aqueous emulsion in the presence of a polymerization initiator, which comprises polymerizing such a monomeric material while dispersed in an aqueous emulsion having a pH between 8 and 12 in the presence of a polymerization initiator and in the presence of an activating amount of an activator which comprises a water-soluble complex of a water-soluble salt of a heavy metal which is capable of existing in each of two valence states and a polyheterocyclic organic compound selected from the group consisting of 2,2'-dipyridyl, 2-(2'-pyridyl) quinoline, o-phenanthroline, and 2,2',2''-terpyridine.

12. A process for the production of a polymeric synthetic rubber, which comprises polymerizing a monomeric material comprising a major amount of 1,3-butadiene while dispersed in an aqeous emulsion having a pH between 8 and 12 at a temperature between −30 and 20° C. in the presence of 0.02 to 2 parts of a polymerization initiator and in the presence of 0.5 to 3 parts of a water-soluble complex of a water-soluble iron salt and a polyheterocyclic organic compound selected from the group consisting of 2,2'-dipyridyl, 2-(2'-pyridyl)quinoline, o-phenanthroline, and 2,2',2''-terpyridine, said parts being parts by weight per 100 parts of said monomeric material, with a mol ratio of iron salt to said polyheterocyclic organic compound between 1:1 and 1:6.

13. The process of claim 11 in which said heavy metal is iron.

14. A process for the polymerization of a monomeric material comprising a conjugated diene, which comprises polymerizing such a monomeric material while dispersed in an aqueous medium having a pH between 8 and 12 in the presence of a polymerization initiator and in the presence of an activating amount of an activator which comprises a water-soluble complex of a water-soluble iron salt and a polyheterocyclic organic compound selected from the group consisting of 2,2'-dipyridyl, 2-(2'-pyridyl) quinoline, o-phenanthroline, and 2,2',2''-terpyridine.

CARL A. URANECK.

REFERENCES CITED

The following references are of record in the file of this patent:

UNITED STATES PATENTS

| Number | Name | Date |
|---|---|---|
| 2,430,590 | Stewart | Nov. 11, 1947 |